United States Patent
Mozzati et al.

(10) Patent No.: US 7,641,027 B2
(45) Date of Patent: Jan. 5, 2010

(54) BRAKE DISC

(75) Inventors: Alberto Mozzati, Presezzo (IT); David Guastamacchia, Gorgonzola (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 0 days.

(21) Appl. No.: 12/159,647

(22) PCT Filed: Feb. 7, 2006

(86) PCT No.: PCT/IT2006/000063

§ 371 (c)(1),
(2), (4) Date: Jul. 9, 2008

(87) PCT Pub. No.: WO2007/091282

PCT Pub. Date: Aug. 16, 2007

(65) Prior Publication Data

US 2008/0296108 A1    Dec. 4, 2008

(51) Int. Cl.
*F16D 65/12* (2006.01)
(52) U.S. Cl. .................................. 188/218 XL; 188/17
(58) Field of Classification Search ............... 188/17, 188/18 A, 26, 218 XL
See application file for complete search history.

(56) References Cited

U.S. PATENT DOCUMENTS

| | | | | |
|---|---|---|---|---|
| 2,987,143 A * | 6/1961 | Fuchs et al. | ................ | 188/71.5 |
| 4,821,848 A * | 4/1989 | Izumine | ................ | 188/218 XL |
| 4,848,521 A * | 7/1989 | Izumine | .................... | 188/18 A |
| 5,139,117 A | 8/1992 | Melinat | | |
| 5,520,269 A * | 5/1996 | Yamamoto et al. | .... | 188/218 XL |
| 5,850,895 A * | 12/1998 | Evrard | .................... | 188/264 A |
| 6,206,144 B1* | 3/2001 | Di Bella | ....................... | 188/26 |
| 6,305,510 B1* | 10/2001 | Bunker | ................ | 188/218 XL |
| 6,386,340 B1* | 5/2002 | Milesi et al. | .......... | 188/218 XL |
| 6,957,726 B2* | 10/2005 | Gehrs | ................... | 188/218 XL |
| 7,007,776 B1* | 3/2006 | Lin | ......................... | 188/24.22 |

FOREIGN PATENT DOCUMENTS

| | | |
|---|---|---|
| DE | 2217009 | 10/1973 |
| DE | 29910528 | 9/1999 |
| EP | 1048874 | 11/2000 |
| WO | 01/86166 | 11/2001 |

* cited by examiner

*Primary Examiner*—Christopher P Schwartz
(74) *Attorney, Agent, or Firm*—Shoemaker and Mattare (57) ABSTRACT

A brake disc of the type comprising a braking band, a connecting portion and connecting spokes made in a single piece. In said disc at least one spoke exhibits an active section reduction that is sufficient to prevent vibrations and whistling during the braking phase. The disc, according to the present invention, is not subject to vibrations and possesses a limited gyroscopic effect and mass.

21 Claims, 13 Drawing Sheets

BRAKE DISC

FIELD OF THE INVENTION

The present invention relates to a brake disc for vehicles; in particular, the present invention relates to brake discs that are suitable for being used on motorcycles.

BACKGROUND OF THE INVENTION

As we know, in some motorcycles the front or back wheels often comprise an integrally formed brake disc, in other words comprising a portion for connecting to the hub, a braking band and a plurality of spokes made in a single piece.

During braking, these brake discs may suffer vibrations that cause an irritating whistling.

Solutions suitable for eliminating this inconvenience are not known in the art.

SUMMARY OF THE INVENTION

The problem of the present invention is to make a brake disc for vehicles that resolves the inconveniences stated with reference to the prior art.

These inconveniences are resolved by a brake disc for vehicles as described below.

BRIEF DESCRIPTION OF THE DRAWINGS

Further characteristics and advantages of the present invention will be appreciated from the following description of a preferred embodiment, wherein.

DETAILED DESCRIPTION OF THE INVENTION

The elements or parts of elements in common between the subsequently described embodiments will be indicated with the same numeral references.

The term radial direction means a direction that is substantially perpendicular to an X rotation axis of the disc.

The term axial direction means a direction that is substantially parallel to the X rotation axis of the disc.

The term tangential direction means a direction that is substantially perpendicular to the axial direction and to the radial direction.

With reference to the above drawings, a brake disc for vehicles with an X rotation axis is generally indicated with reference numeral 4.

The brake disc 4 comprises a connecting portion 8 to a wheel hub of a vehicle, a braking band 12 and at least one spoke 16 interconnecting the connecting portion 8 and the braking band 12.

The braking band 12 is preferably connected to the connecting portion 8 by means of a plurality of spokes 16 that are preferably arranged in step.

The brake disc 4 is formed integrally, in particular, the braking band 12 is integral with the connecting portion 8 and with the spokes 16.

Advantageously, at least one spoke 16 comprises an active section reduction 18 to provide reduced rigidity in relation to the corresponding integral section.

According to an embodiment of the present invention, the section reduction 18 is made with a lightening 19 that is suitable for reducing the axial thickness of a portion of the spoke.

Figure 1:
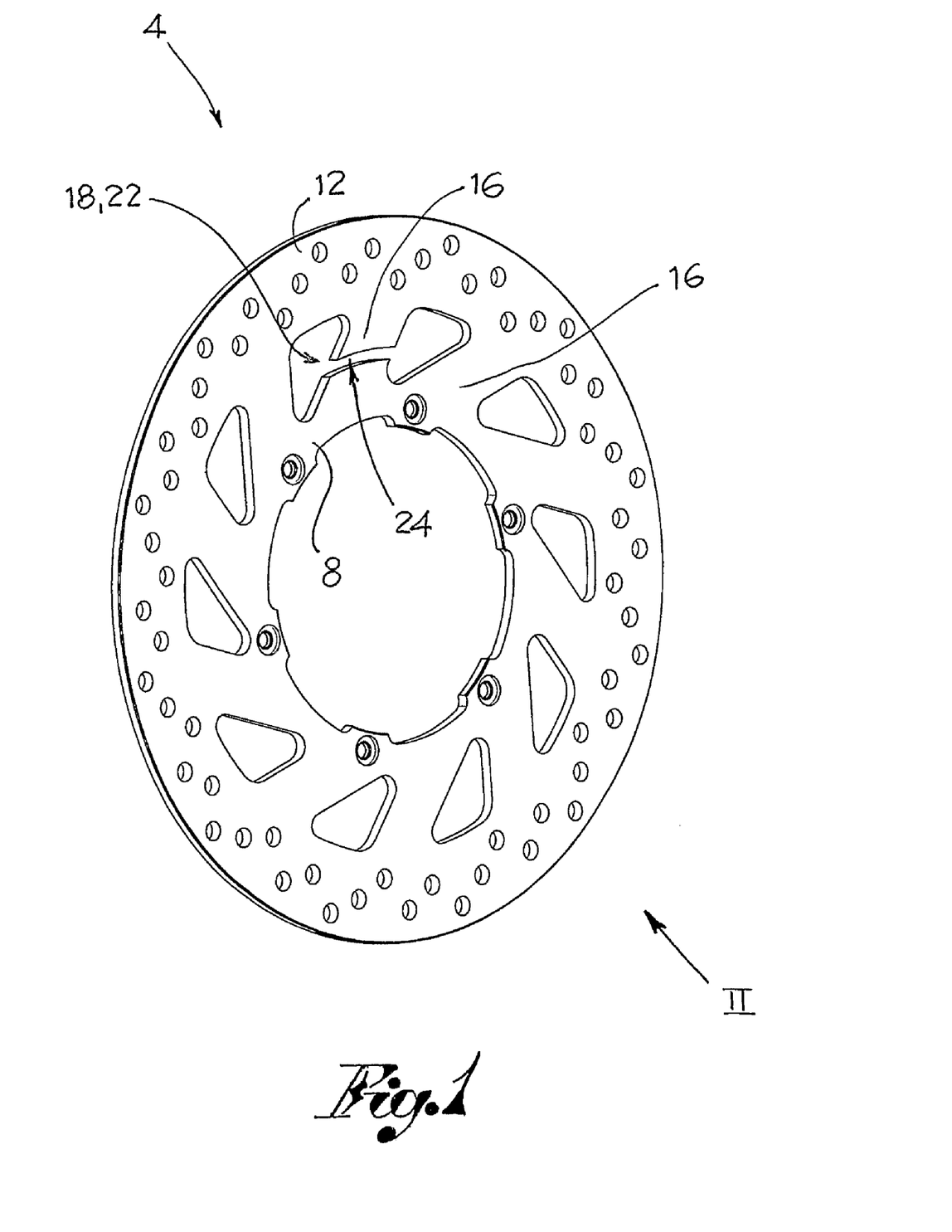
FIG. 1 represents a perspective view of a brake disc according to an embodiment of the present invention.
Figure 2:
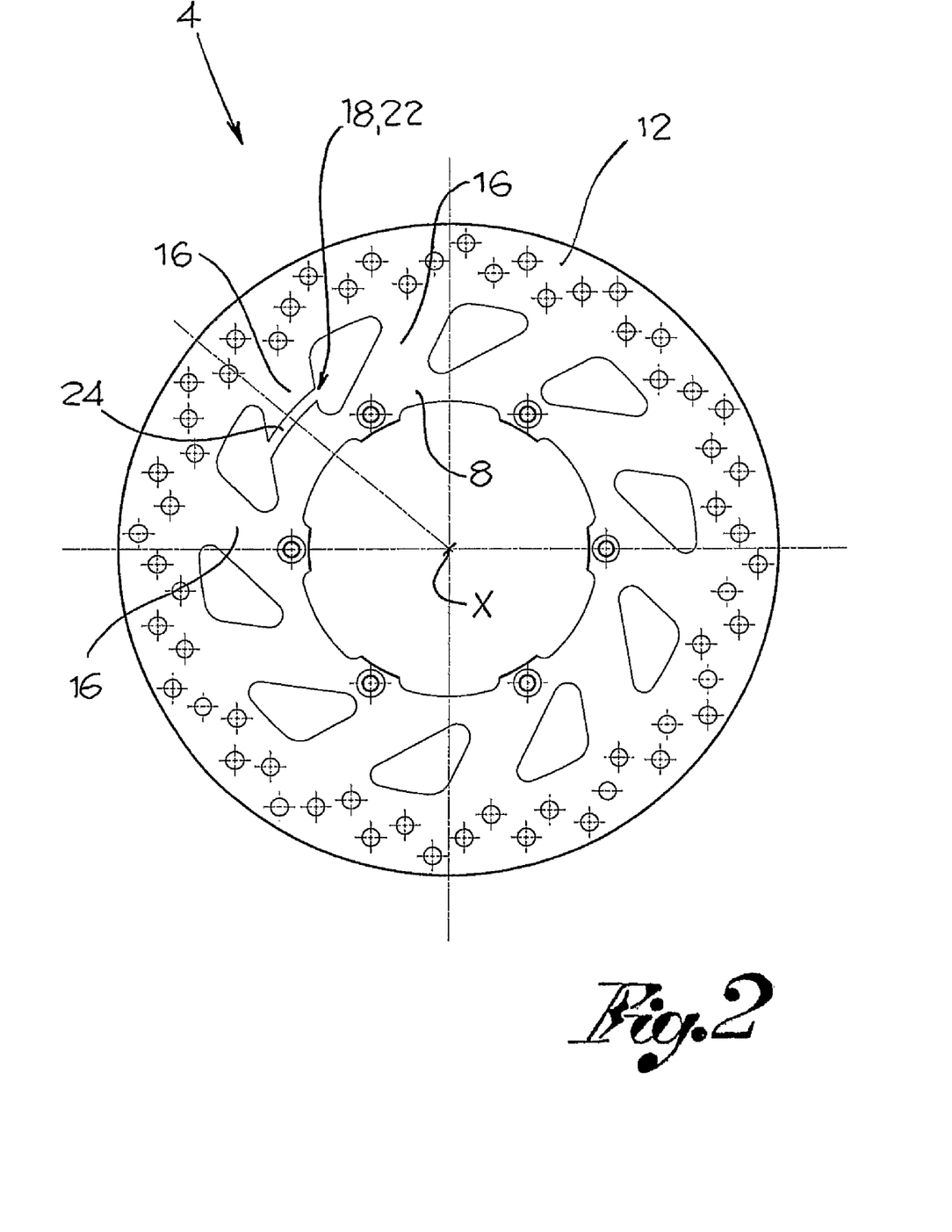
FIG. 2 represents a front view of the disc in FIG. 1, from the side of the arrow II in FIG. 1.
Figure 3:
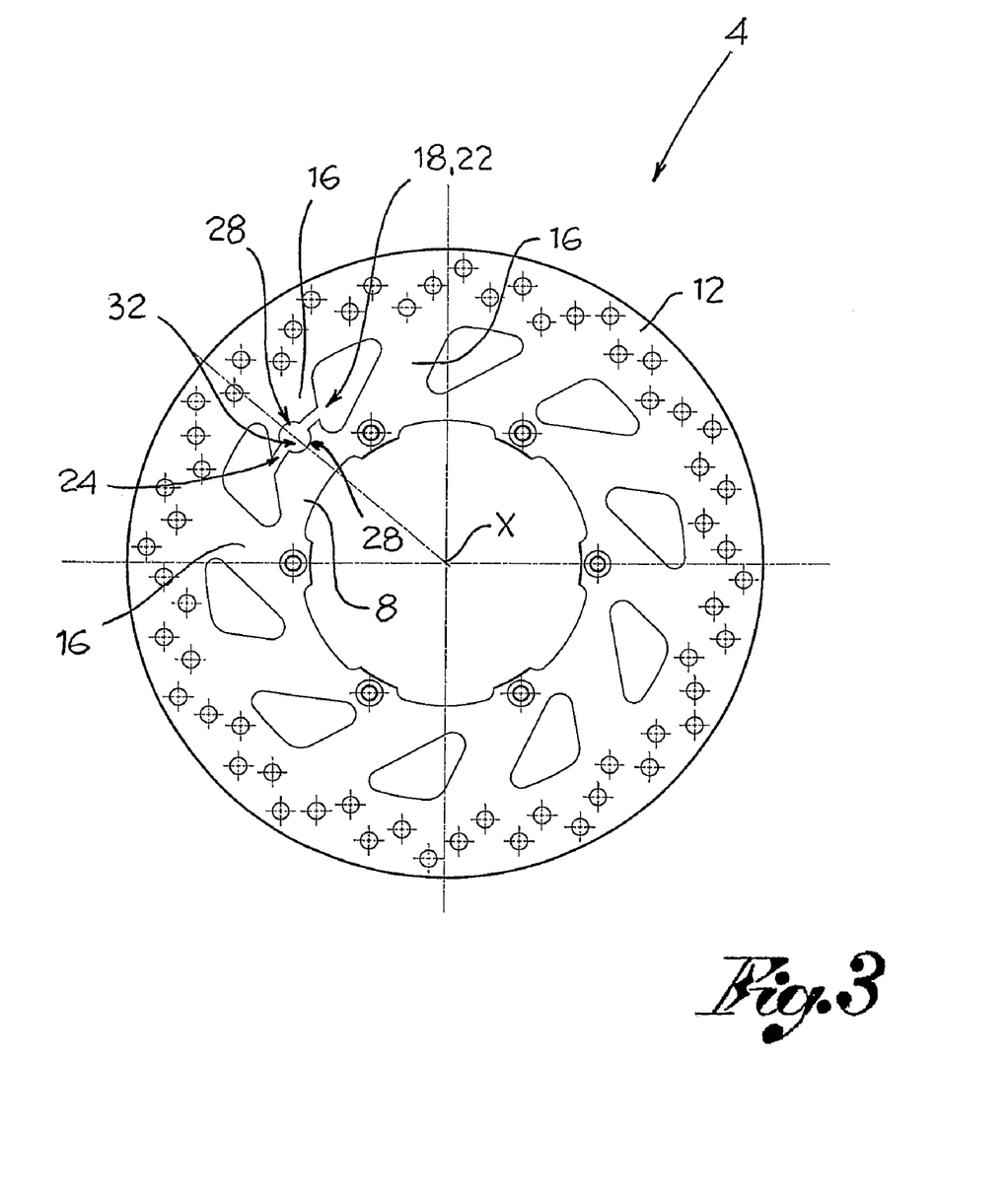
FIG. 3 represents a front view of a brake disc according to a further embodiment of the present invention.
Figure 4:
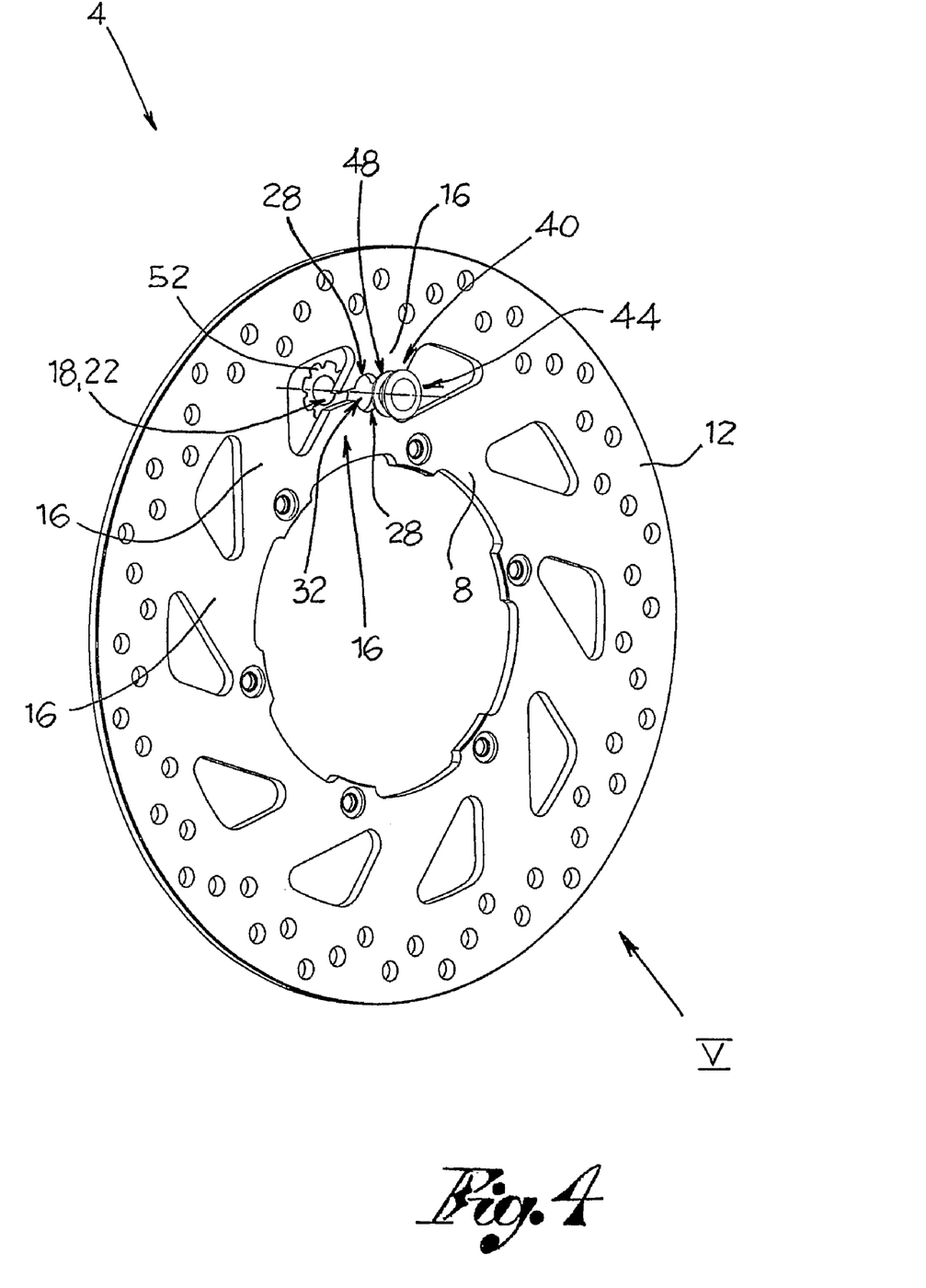
FIG. 4 represents a perspective view with separate parts of a disc according to a further embodiment of the present invention.
Figure 5:
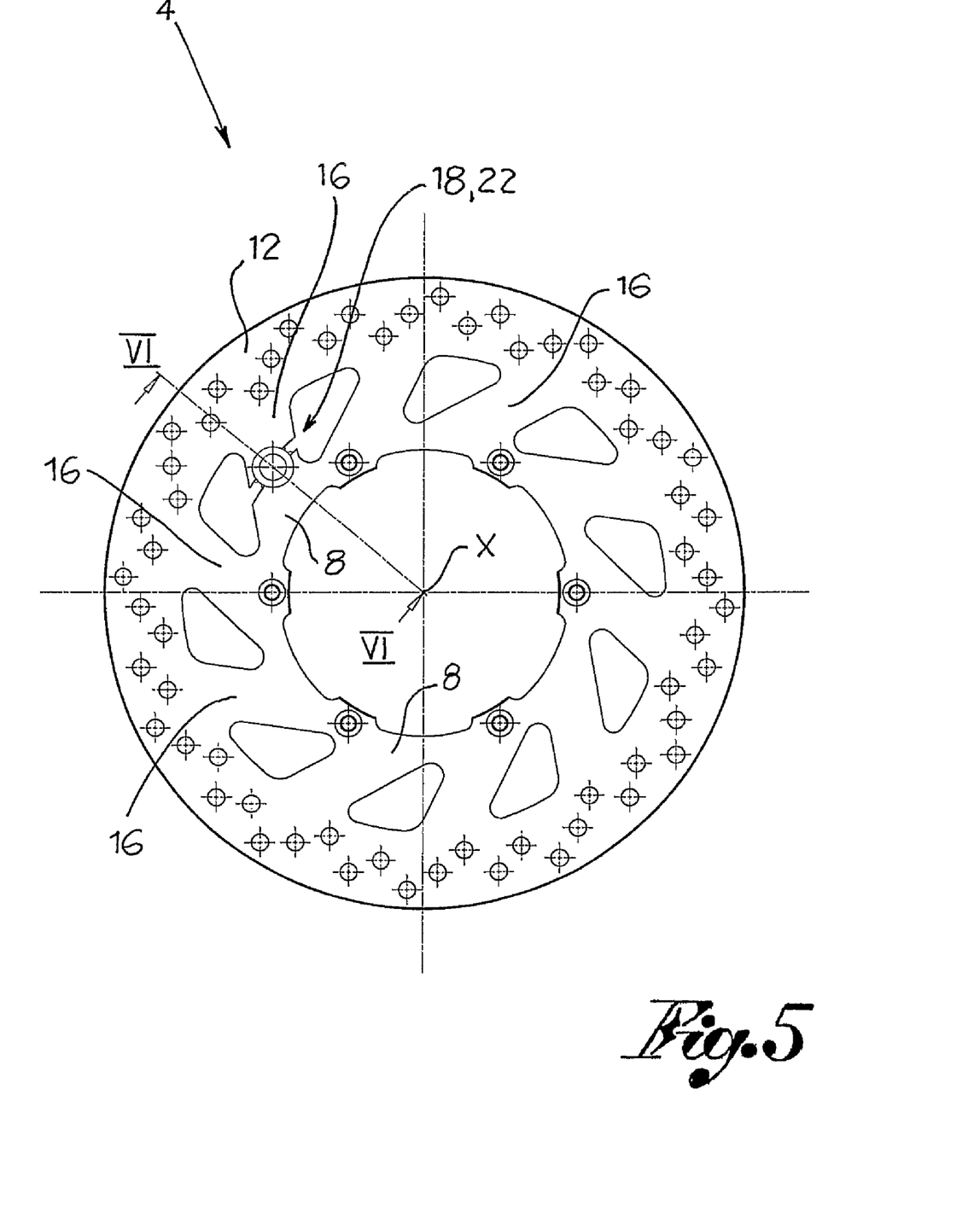
FIG. 5 represents a front view of the disc in FIG. 4, from the side of the arrow V in FIG. 4.
Figure 6:
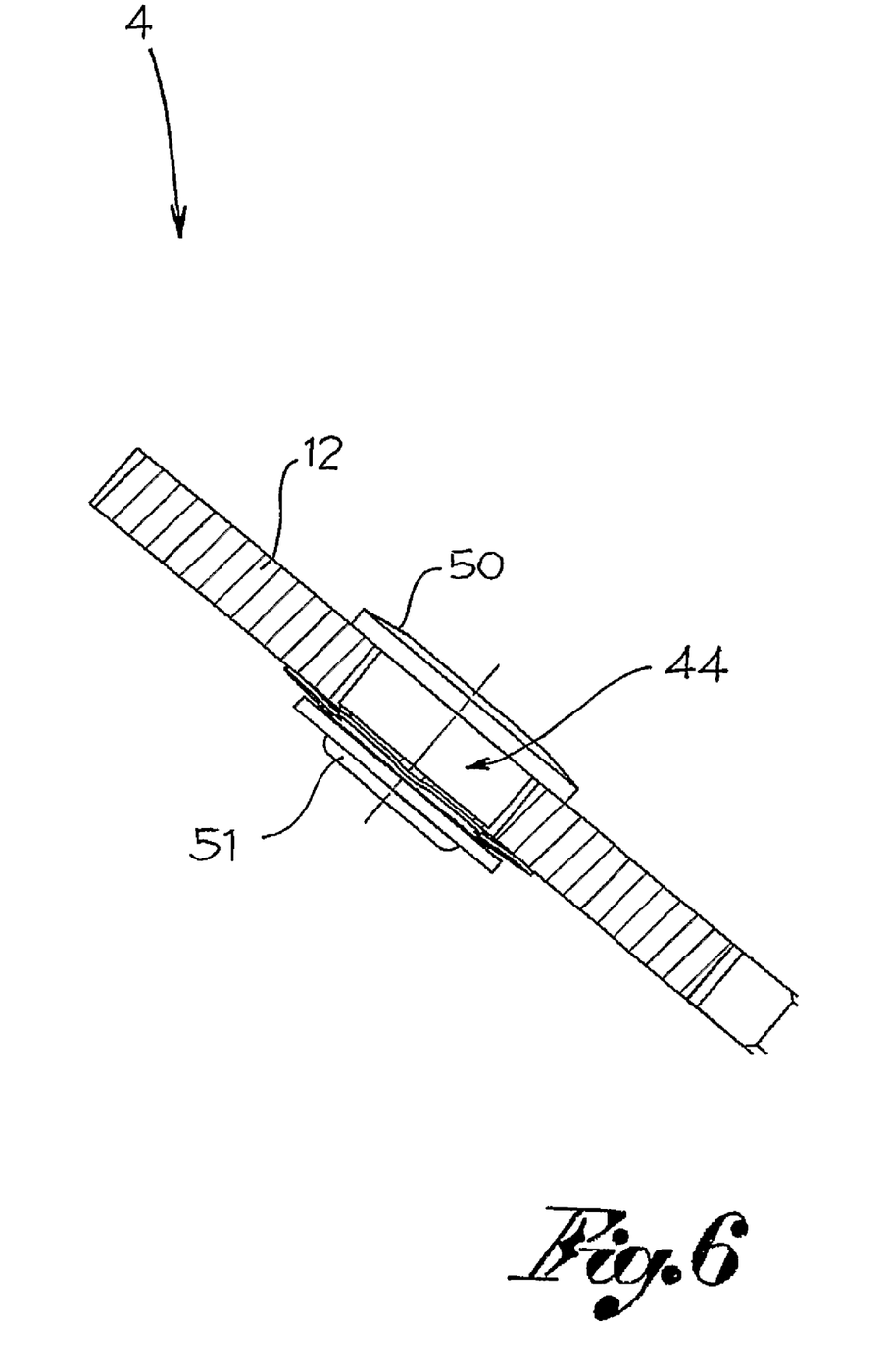
FIG. 6 represents a section view of the disc in FIG. 5, along the VI-VI section line in FIG. 5.
Figure 7:
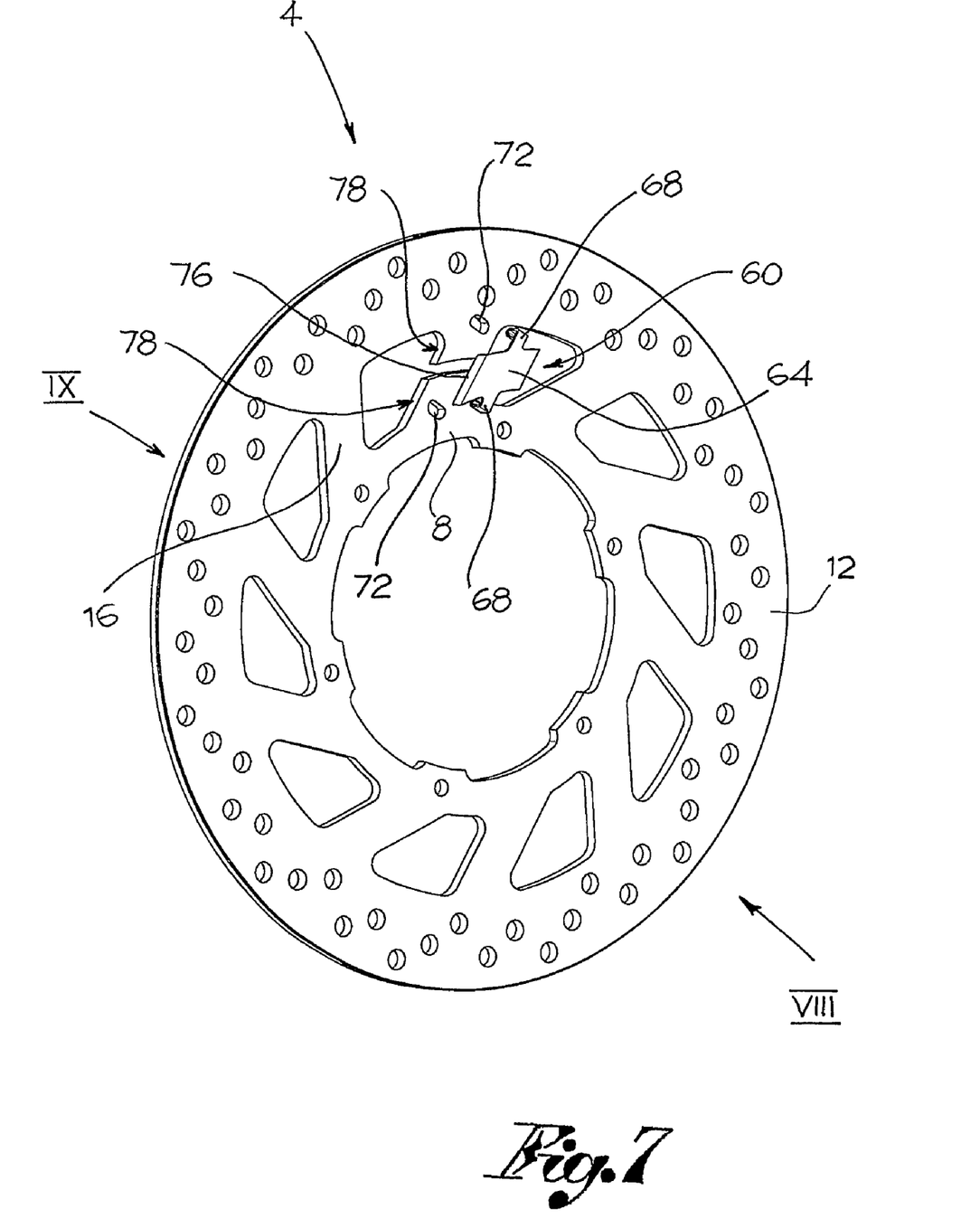
FIG. 7 represents a perspective view with separate parts of a brake disc according to a further embodiment of the present invention.
Figure 8:
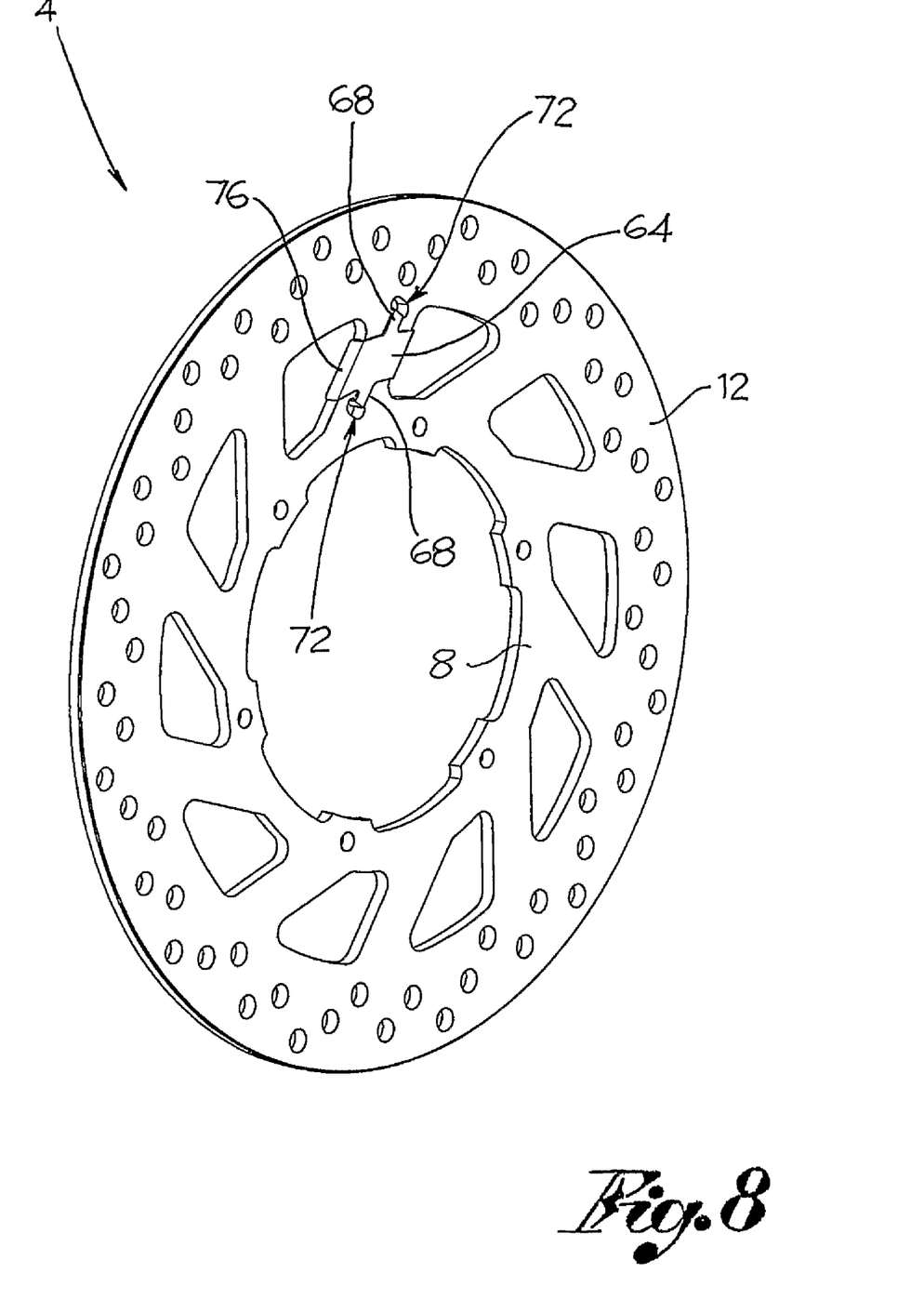
FIG. 8 represents a perspective view of the disc in FIG. 7 in an assembly configuration, from the side of the arrow VIII in FIG. 7.
Figure 9:
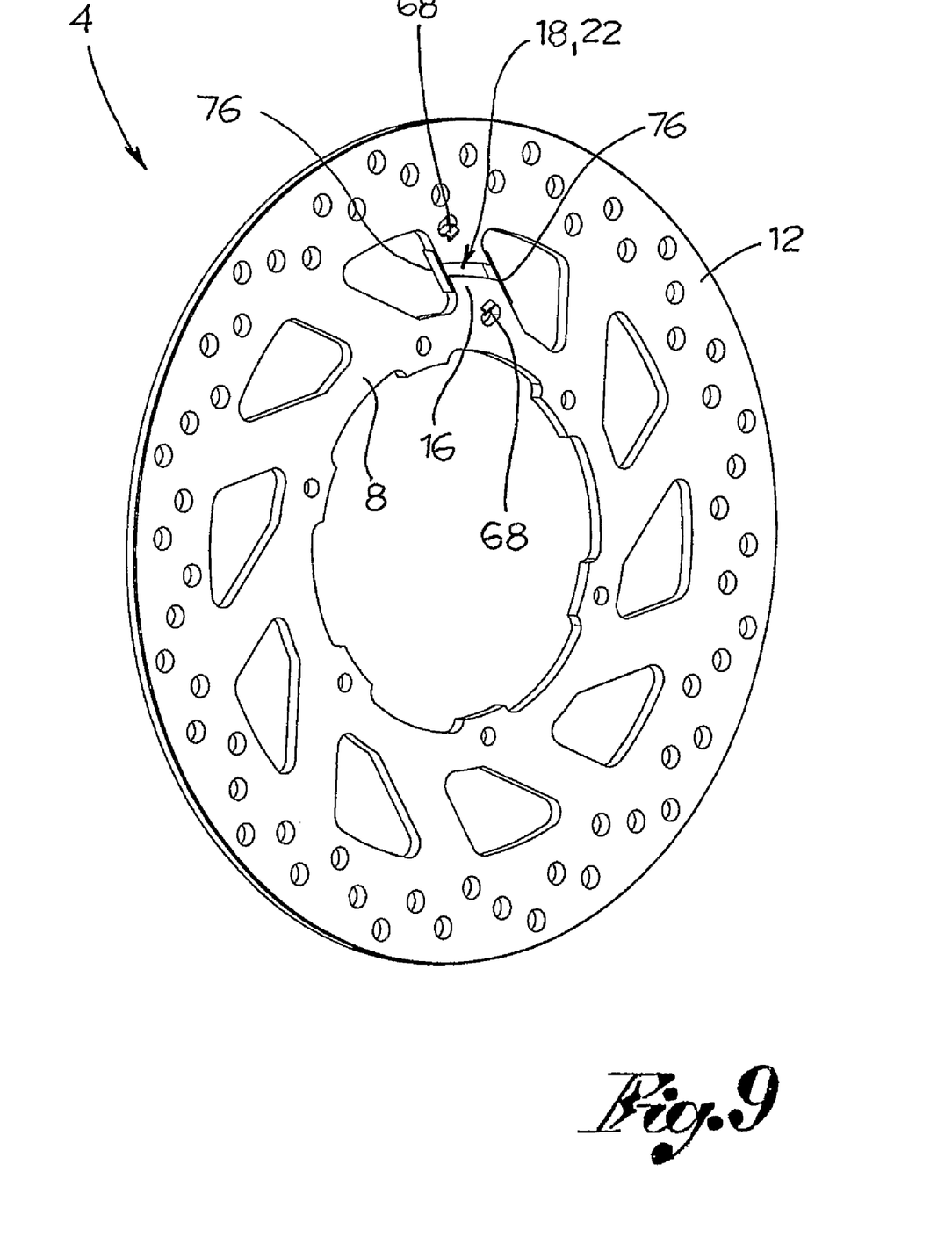
FIG. 9 represents a perspective view of the disc in FIG. 7 in an assembly configuration, from the side of the arrow IX in FIG. 7.
Figure 10:
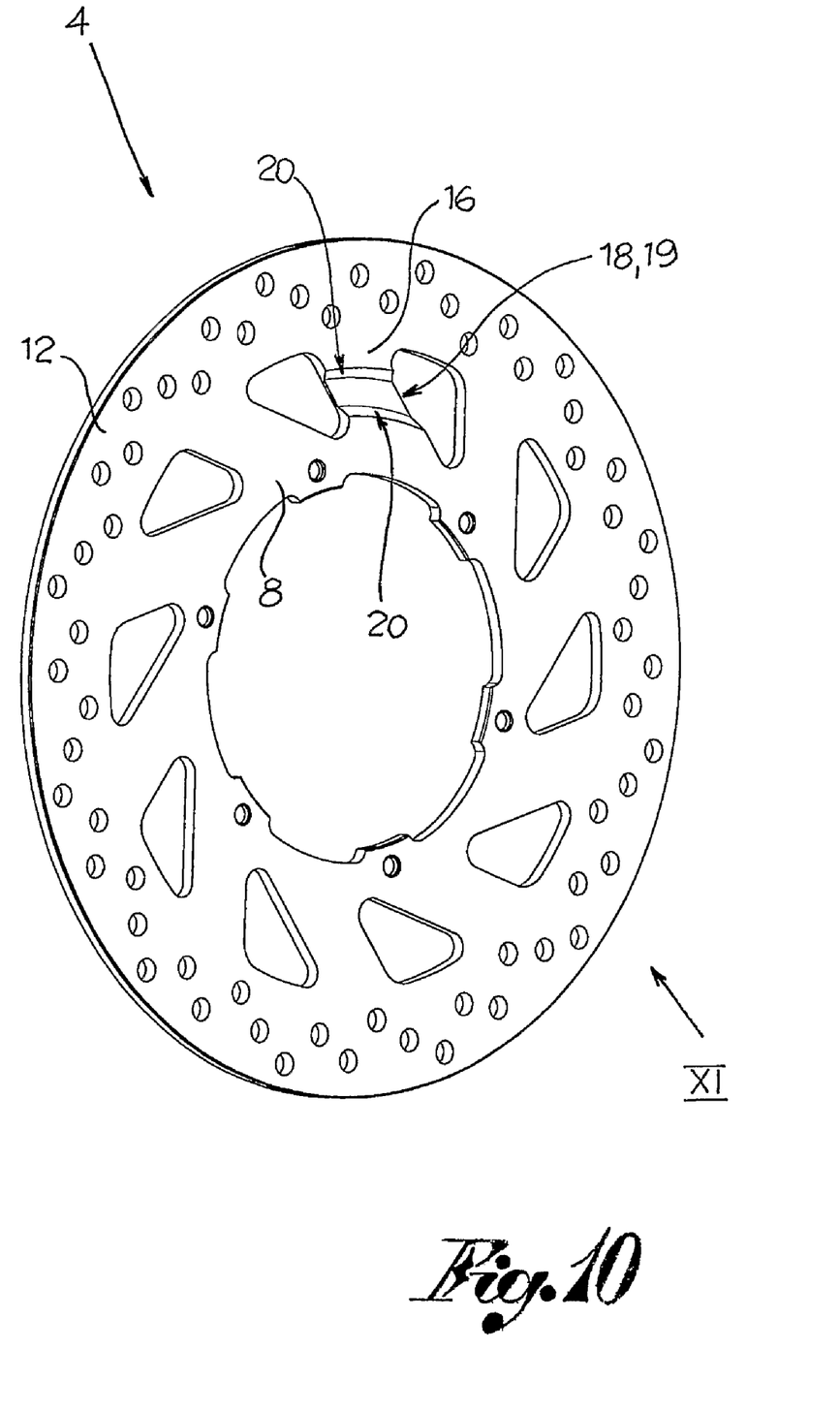
FIG. 10 represents a perspective view of a disc according to a further embodiment of the present invention.
Figures 11, 12:
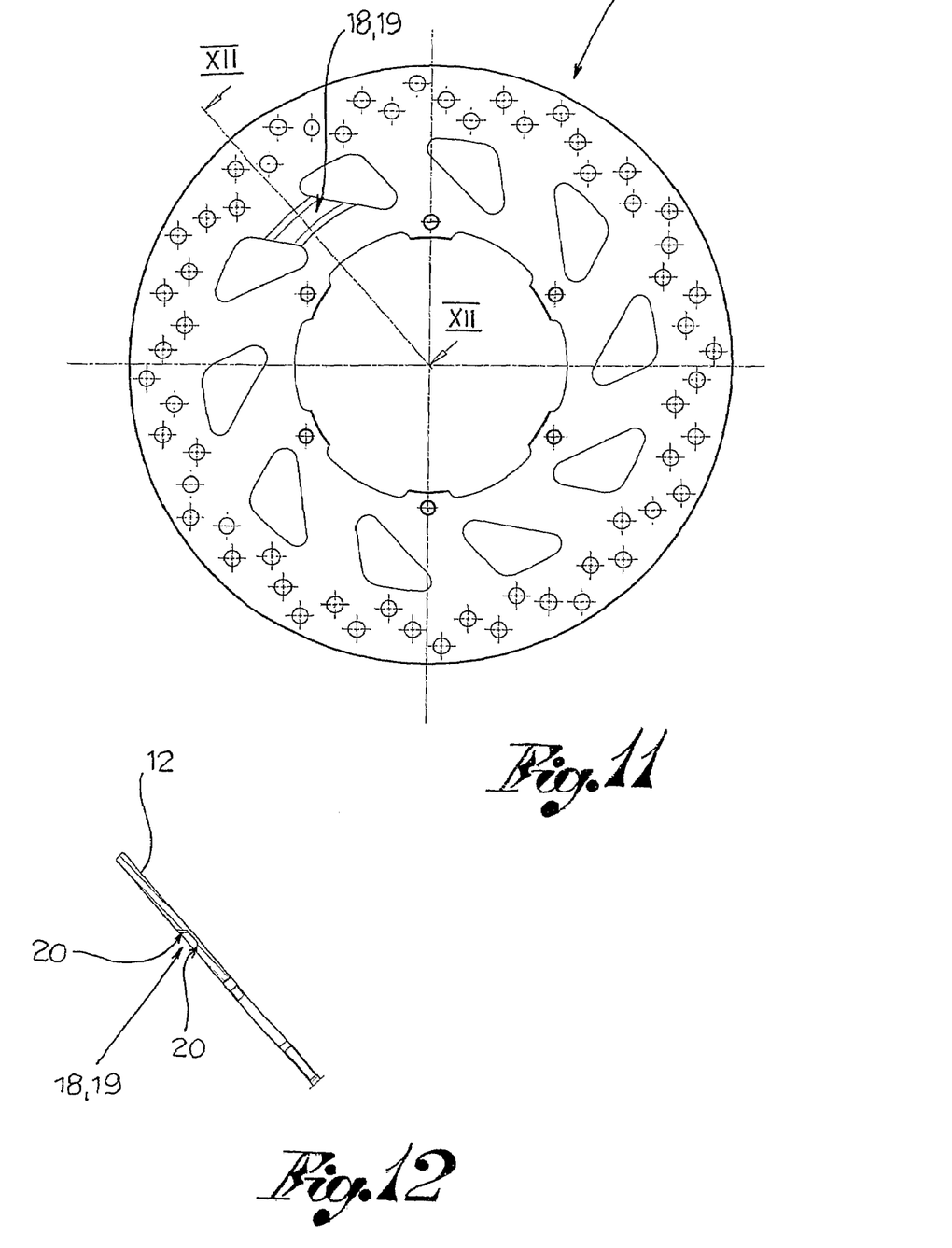
FIG. 11 represents a front view of the disc in FIG. 10, from the side of the arrow XI in FIG. 10.
FIG. 12 represents a section view of the disc in FIG. 10, along the XII-XII section line in FIG. 11.

According to one embodiment (FIGS. 11, 12), the lightening 19 has a tangential course that is sufficient to influence the whole tangential width of the spoke 16. The lightening 19 can be defined by one or more chamfers or flares 20, which are arranged tangentially and parallel between each other.

According to a further embodiment (FIGS. 13-15), the lightening 19 has a circular course defining a cylindrical pocket.

Figure 13:
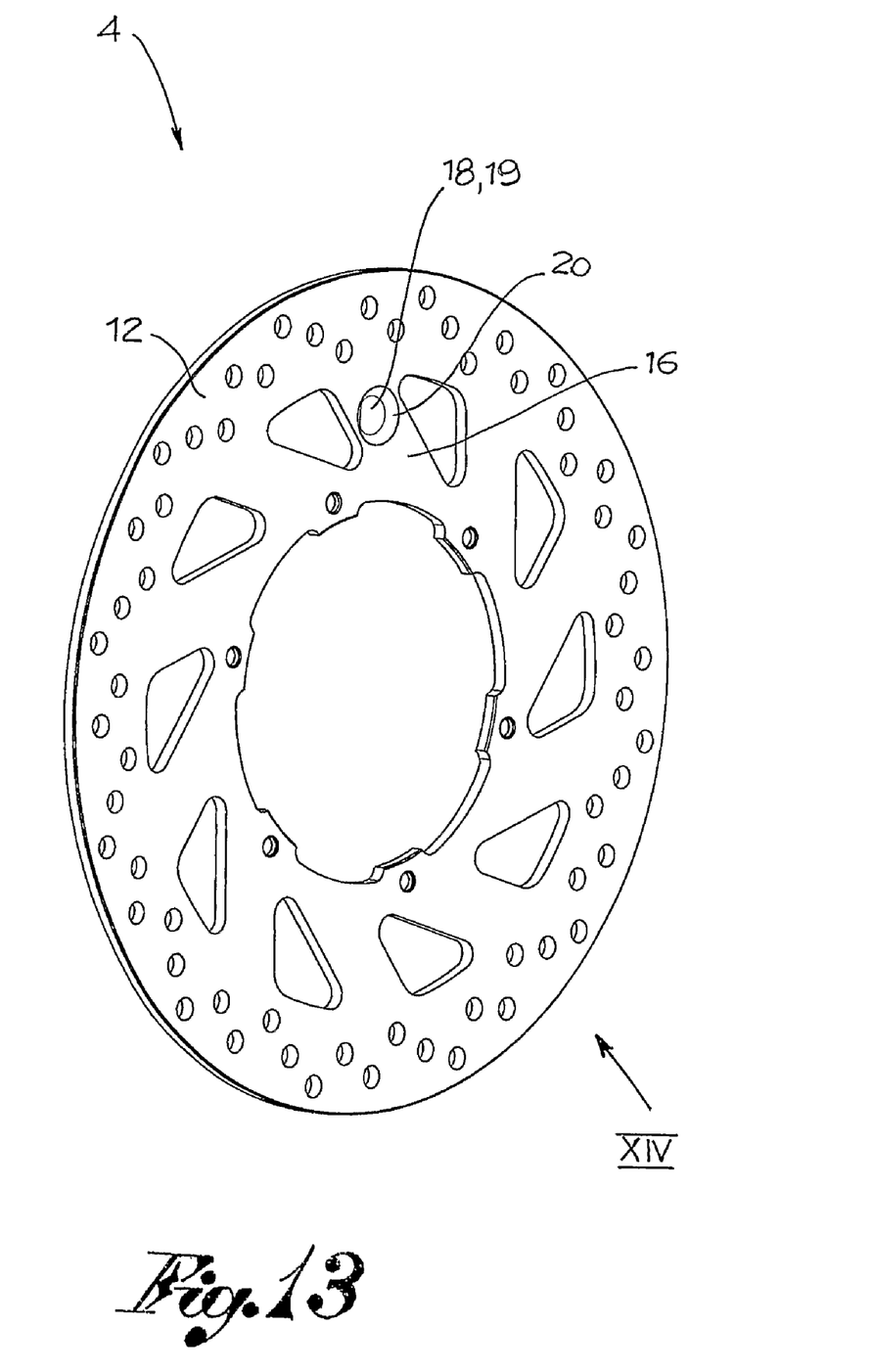
FIG. 13 represents a perspective view of a disc according to a further embodiment of the present invention.
Figures 14, 15:
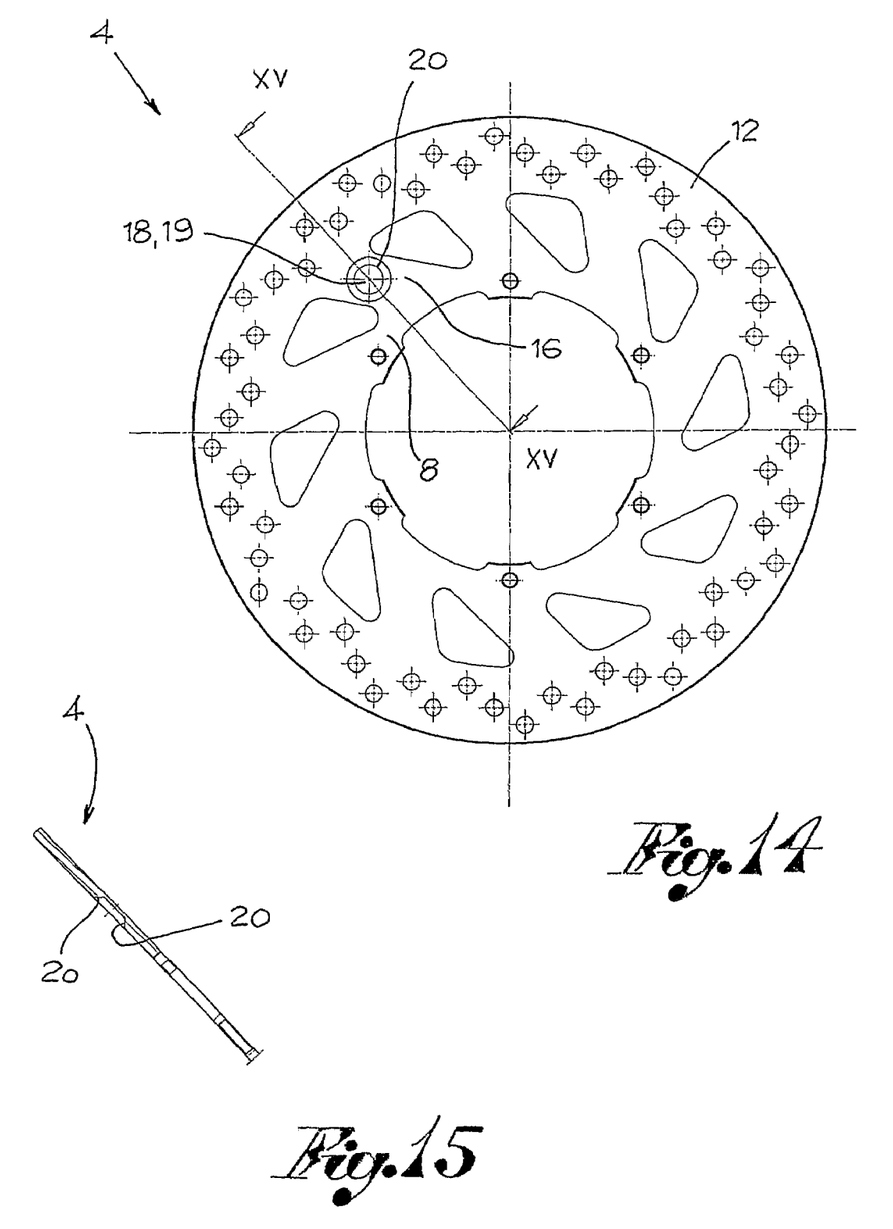
FIG. 14 represents a front view of the disc in FIG. 13, from the side of the arrow XIV in FIG. 13.
FIG. 15 represents a section view of the disc in FIG. 13, along the XV-XV section line in FIG. 14.

The lightening 19 with a circular course is preferably defined by a chamfer or flare 20 arranged on the side of one face of the disc.

The lightening 19 preferably limits the active section of the spoke 16 to maintain the continuity, level with said spoke 16, between the connecting portion 8 and the braking band 12. In other words, the lightening 19 reduces the active section of the spoke 16 but does not completely interrupt the continuity of the same spoke, or rather the mechanical connection that the spoke forms between the braking band 12 and the connecting portion 8.

The lightening 19 preferably reduces the active section of the spoke 16 to no more than 40% of the active section of the integral spoke 16. In other words, the lightening 19 reduces the active section of the spoke 16 by at least 60% compared with the corresponding section of the integral spoke 16.

According to an advantageous embodiment (FIGS. 1-5), the section reduction 18 creates an interruption 22 of the spoke 16 so as to divide the spoke 16 into two parts and interrupt the continuity between the connecting portion 8 and the braking band 12.

According to an embodiment, the interruption 22 is arranged level with a portion of the spoke 16 next to the braking band 12.

According to an embodiment, the interruption 22 comprises a direct channel 24 that is substantially tangential to the braking band 12 so as to affect the whole tangential thickness of the spoke 16 dividing it into two separate parts.

The interruption 22 preferably comprises at least one indentation 28 in relation to a radial direction, which is suitable for defining a slot 32 with said channel 24.

According to an embodiment, the interruption 22 comprises a pair of indentations 28 that are radially facing and arranged on each of the ends of the opposite portions of the spoke 16 facing each other, the indentations 28 defining a slot 32 with the channel 24.

The slot 32 is preferably symmetrical in relation to a radial direction passing the X rotation axis of the disc 4.

The slot 32 is also preferably symmetrical in relation to a tangential direction, perpendicular to a radius of the disc.

According to an advantageous embodiment, the disc 4 comprises at least one bush 40 contained in the slot 32 and the channel 24 so it is constrained by the indentations 28 in relation to a tangential direction.

According to an embodiment, the bush 40 comprises a bush body 44 and constraining means 48. According to an embodiment the bush 40 is formed integrally and level with an axial end, said constraining means comprise a first head 50, and at the opposite end they comprise a second head 51, which is obtained, for example, by riveting. These heads 50, 51 exhibit a greater diameter than the diameter of the slot 32 so as to axially constrain the bush 40 in relation to the slot 32.

An elastic element 52 is preferably inserted between the bush body 44 and one of the heads 50,51, suitable for pre-charging the bush body 44 and the constraining means 50,51 in relation to an axial direction.

According to an embodiment, said elastic element 52 is a washer spring.

The mass of the bush 40 is preferably substantially equal to the mass of material removed from the spoke 16 to form the interruption.

According to a further embodiment, the disc comprises at least one small plate 60 suitable for being connected to the slot 32 or the channel 24 so as to cover the interruption 22 at least partially.

The small plate 60 preferably has a plate body 64, for example that is flat and equipped with a pair of fastening flaps 68 that are suitable for being constrained by clicking or mortising to special fastening holes 72, which are arranged, for example, on the spoke on the side of the connecting portion 8 and the braking band 12.

According to an embodiment, the plate body 64 comprises two flaps 76 suitable for being hooked by clicking onto side edges 78 of the spoke, which are separated by the interruption 22.

The plate body 64 preferably has a tangential extension so as to completely cover the interruption 22.

The mass of said plate 60 is preferably substantially equal to the mass of material removed from the spoke 16 to form the interruption 22.

Advantageously, in an assembly configuration of the disc 4 on the relative wheel hub, the disc is oriented angularly to bring the interruption 22 and the connectable bush 40 or plate 60 into a diametrically opposite position in relation to the inflation valve of the relative tyre to be connected to the rim.

According to a further embodiment, at least two spokes 16 of the disc 4 comprise an active section reduction 18 to exhibit reduced rigidity in relation to the corresponding integral section.

Said active section reduction 18 can be made with a lightening 19 or an interruption 20. In an embodiment comprising two spokes 16, with an active section reduction 18, said spokes 16 are preferably arranged in diametrically opposite positions in relation to said X rotation axis of the disc 4.

In an embodiment comprising at least two spokes 16 or a plurality of spokes 16, comprising an active section reduction 18, the spokes 16, comprising an active section reduction 18 are preferably arranged in step in relation to the X rotation axis.

As we can appreciate from the description, the brake disc of the present invention enables the inconveniences exhibited by the brake disc of the prior art to be overcome.

In particular, the disc according to the invention does not vibrate and whistle during braking.

The disc in the present invention maintains a gyroscopic effect, as well as a reduced, non suspended mass.

In order to satisfy specific and contingent needs, a person skilled in the art can make numerous modifications and variations to the above described brake discs, all of which are included in the scope of the invention, as defined by the following claims.

We claim:

1. Brake disc with a rotation axis, said disc comprising
   a hub connecting portion for connection to a hub,
   a braking band, and
   a plurality of spokes interconnecting the braking band and the hub connecting portion,
   said hub connecting portion, braking band and spokes being a single piece, wherein
   at least one spoke has an interruption which divides the spoke into two parts, and interrupts continuity between the hub connecting portion and the braking band.

2. Brake disc according to claim 1, wherein said interruption comprises a direct channel that is substantially tangential to the braking band, in relation to said rotation axis.

3. Brake disc according to claim 2, wherein said interruption comprises at least one indentation in relation to a radial direction, which is suitable for defining a slot with said channel.

4. Brake disc according to claim 3, wherein said disc comprises at least one bush contained in said slot and in said channel so it is constrained by said indentations in relation to a tangential direction.

5. Brake disc according to claim 4, wherein said bush comprises a bush body and constraining means that are axially constrained between each other.

6. Brake disc according to claim 5, wherein said constraining means comprise a first head and at an opposite end they comprise a second head, said heads having a greater diameter than the diameter of the slot so as to constrain the bush axially in relation to the slot.

7. Brake disc according to claim 6, wherein an elastic element is inserted between said bush body and one of said heads, which is suitable for pre-charging the bush body and the constraining means in relation to an axial direction.

8. Brake disc according to claim 7, wherein said elastic element is a washer spring.

9. Brake disc according to claim 4, wherein the mass of said bush is substantially equal to the mass of material removed from the spoke to form said interruption.

10. Brake disc according to claim 3, wherein said disc comprises at least one small plate contained in said slot or in said channel so as to cover said interruption at least partially.

11. Brake disc according to claim 10, wherein the small plate comprises a plate body equipped with a pair of fastening flaps that are suitable for being constrained by clicking or mortising to special fastening holes in the disc.

12. Brake disc according to claim 11, wherein said fastening holes are arranged on the spoke on the side of the connecting portion and the braking band.

13. Brake disc according to claim 10, wherein the plate body comprises two flaps which can be hooked by clicking onto side edges of the spoke, which are separated by the interruption.

14. Brake disc according to claim 10, wherein the mass of said plate is substantially equal to the mass of material removed from the spoke to form said interruption.

15. Brake disc according to claim 3, wherein said slot is symmetrical in relation to a tangential direction, perpendicular to a radius of the disc.

16. Brake disc according to claim 3, wherein said slot is symmetrical in relation to a radial direction passing through the rotation axis of the disc.

17. Brake disc according to claim 2, wherein said interruption comprises a pair of indentations that are radially facing and arranged on ends of opposite portions of the spoke facing each other, said indentations defining a slot with said channel.

18. Brake disc according to claim 1, wherein at least two spokes of said disc comprise an interruption which interrupts continuity between the hub connecting portion and the braking band.

19. Brake disc according to claim 18, wherein said at least two spokes, comprising an interruption are arranged in diametrically opposite positions in relation to said rotation axis.

20. Brake disc according to claim 18, wherein said at least two spokes, comprising an interruption, are arranged in step in relation to said rotation axis.

21. Brake disc according to claim 1, wherein said interruption is level with a portion of the spoke next to the braking band.

* * * * *